United States Patent [19]
Uya et al.

[11] Patent Number: 5,781,174
[45] Date of Patent: Jul. 14, 1998

[54] IMAGE SYNTHESIZER AND IMAGE POINTING SYSTEM

[75] Inventors: Masaru Uya; Takuya Sayama, both of Osaka, Japan

[73] Assignee: Matsushita Electric Industrial Co., Ltd., Osaka, Japan

[21] Appl. No.: 658,397

[22] Filed: Jun. 5, 1996

Related U.S. Application Data

[63] Continuation of Ser. No. 91,250, Jul. 14, 1993, abandoned.

[30] Foreign Application Priority Data

Jul. 14, 1992 [JP] Japan ................... 4-186491

[51] Int. Cl.[6] ............................................. G09G 5/00
[52] U.S. Cl. .......................... 345/113; 345/114; 345/150; 345/2; 345/156
[58] Field of Search ........................... 345/113, 114, 345/115, 157, 173, 179, 145, 146, 1, 2, 3, 150, 156; 348/578, 586, 587, 588, 589, 590, 591, 592

[56] References Cited

U.S. PATENT DOCUMENTS

| | | | |
|---|---|---|---|
| 4,393,394 | 7/1983 | McCoy | 358/22 |
| 4,682,297 | 7/1987 | Iwami | 345/113 |
| 4,689,616 | 8/1987 | Goude | 345/113 |
| 4,827,253 | 5/1989 | Maltz | 345/113 |
| 4,924,299 | 5/1990 | Mizuno | 345/113 |
| 5,239,373 | 8/1993 | Tang | 345/179 |

FOREIGN PATENT DOCUMENTS 2-127886  5/1990  Japan.
4-156496  5/1992  Japan.

OTHER PUBLICATIONS

H. Ishii et al., "Toward An Open Shared Workspace: Computer and Video Fusion Approach of Teamworkstation", Communications of the ACM, vol. 34, No. 12, Dec. 1991, pp. 37–50.

*Primary Examiner*—Xiao Wu
*Attorney, Agent, or Firm*—McDermott, Will & Emery

[57] ABSTRACT

A "city block" image subject to pointing is given as a first image $V_a$. A "hand" image serving as a pointer pointing something out on the first image $V_a$ is given as a second image $V_b$. A mixer is provided which assigns a weight to pixel data of $V_a$ as well as to pixel data of $V_b$, multiplies each pixel data by its weight, summing the results, and outputting the results as resulting pixel data. A comparator is provided which sends out a coincidence signal when a match is found between pixel data of $V_b$ and a "hand" color requirement defined by given condition data. A data selector is provided which selects and outputs an output of the mixer when the comparator sends out a coincidence signal while otherwise it selects and outputs pixel data of $V_a$. Pixels used to forming the "hand" are specified from $V_b$. With respect to such specified pixel, translucent synthesis of $V_a$ and $V_b$ is carried out. Pixels other than the specified pixels are used to display $V_a$ whereby a sharp synthetic image containing pointing information is obtained.

10 Claims, 13 Drawing Sheets

IMAGE SYNTHESIZER AND IMAGE POINTING SYSTEM

This is a continuation application of application Ser. No. 08/091.250 filed Jul. 14, 1993, now abandoned.

BACKGROUND OF THE INVENTION

The field of this invention is in telecommunication technology. If two multi-media workstations are installed at different locations, and if two users can send and receive video images which are being captured by video cameras at each location, this permits bi-directional telecommunication like the picture phone. Further, if two images shot at different locations are combined into a single image, this creates a "shared virtual workspace" between a user and another at a distance. As a result, an advantageous telecommunication environment is provided so that a user can carry on a conversation or hold a meeting with another at the other end while at the same time pointing a particular thing out on, for example, a document image received. In particular, this invention relates to image synthesizers, and it further relates to image pointing systems.

An image synthesizer and an image pointing system have been disclosed by H. Ishii et al., "Toward an Open Shared Workspace: Computer and Video Fusion Approach of teamwork-station", Commun. ACM Vol. 34, No. 12, pp. 37-50, December 1991, wherein two video images are subjected to a mixing process for translucent synthesis. More specifically, a video image of a hand of a user and a video image of a city block transmitted from another user at a distance are translucently synthesized at a weight ratio of 1:1 thereby outputting, or displaying a resulting synthetic image. That is, the "city block", transmitted from a distant location, is being pointed out by the "hand" in real time.

The above-described conventional technique, however, has a drawback. In such a technique, translucent synthesis processing is carried out at a weight ratio of 1:1 between the entire city block image and the entire hand image. Due to such a disadvantage, the city block image subject to pointing becomes dim or dark. This offers no easy-to-see images to a viewer. For this reason, the prior art technique may not be practical.

DISCLOSURE OF THE INVENTION

It is an object of the present invention to provide an improved technique for displaying a sharp display image subject to pointing.

In accordance with the present invention, a video image subject to pointing is given as a first image and a video image as a pointer is given as a second image. Particular pixels together forming, say, a hand image, are specified from among all the pixels of the second image. The first image is displayed using the remaining pixels (i.e. pixels other than the specified pixels). Either translucent synthesis processing of two images by means of mixing or conversion processing with respect to the first image is applied to the specified pixels. Additionally, image-synthesis inhibit area data indicative of an image-synthesis inhibit area is used so that the execution of translucent synthesis or conversion processing is limited to within a particular window.

Further, in accordance with the present invention, it is possible to obtain a sharp display image subject to pointing, since pixels other than specified pixels are not subjected to translucent synthesis or conversion processing. Additionally, image-synthesis inhibit area data is used, which means that it is possible to keep an unwanted object which has nothing to do with pointing from being displayed. The present invention thus finds itself very useful when applied to multi-media workstations utilizing video images for telecommunication.

DESCRIPTION OF THE INVENTION

With reference to the drawings, examples of the present invention are described below.

EXAMPLE I

Figure 1:
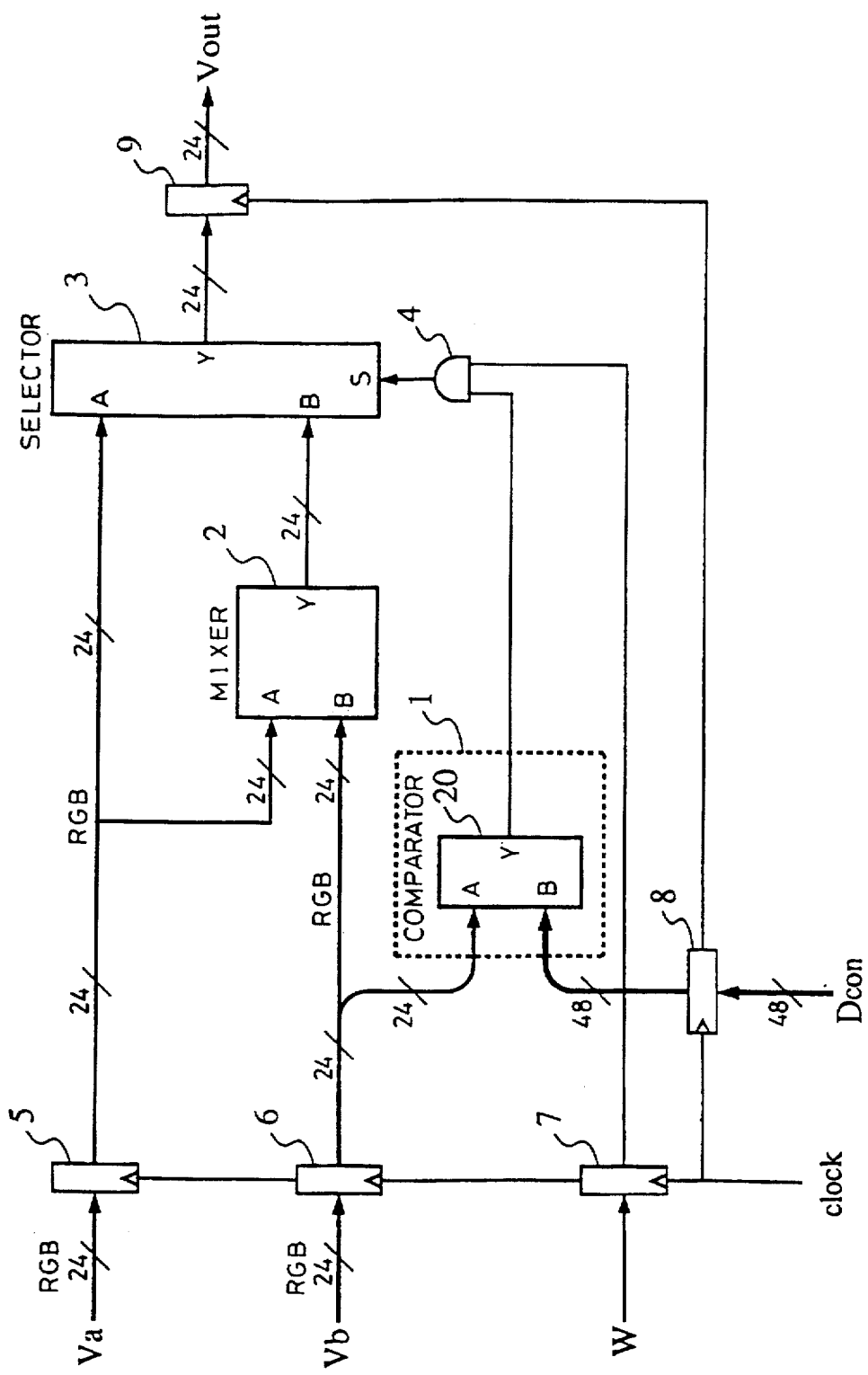
FIG. 1 is a schematic diagram showing an image synthesizer of a first example of the present invention.
Figure 3:
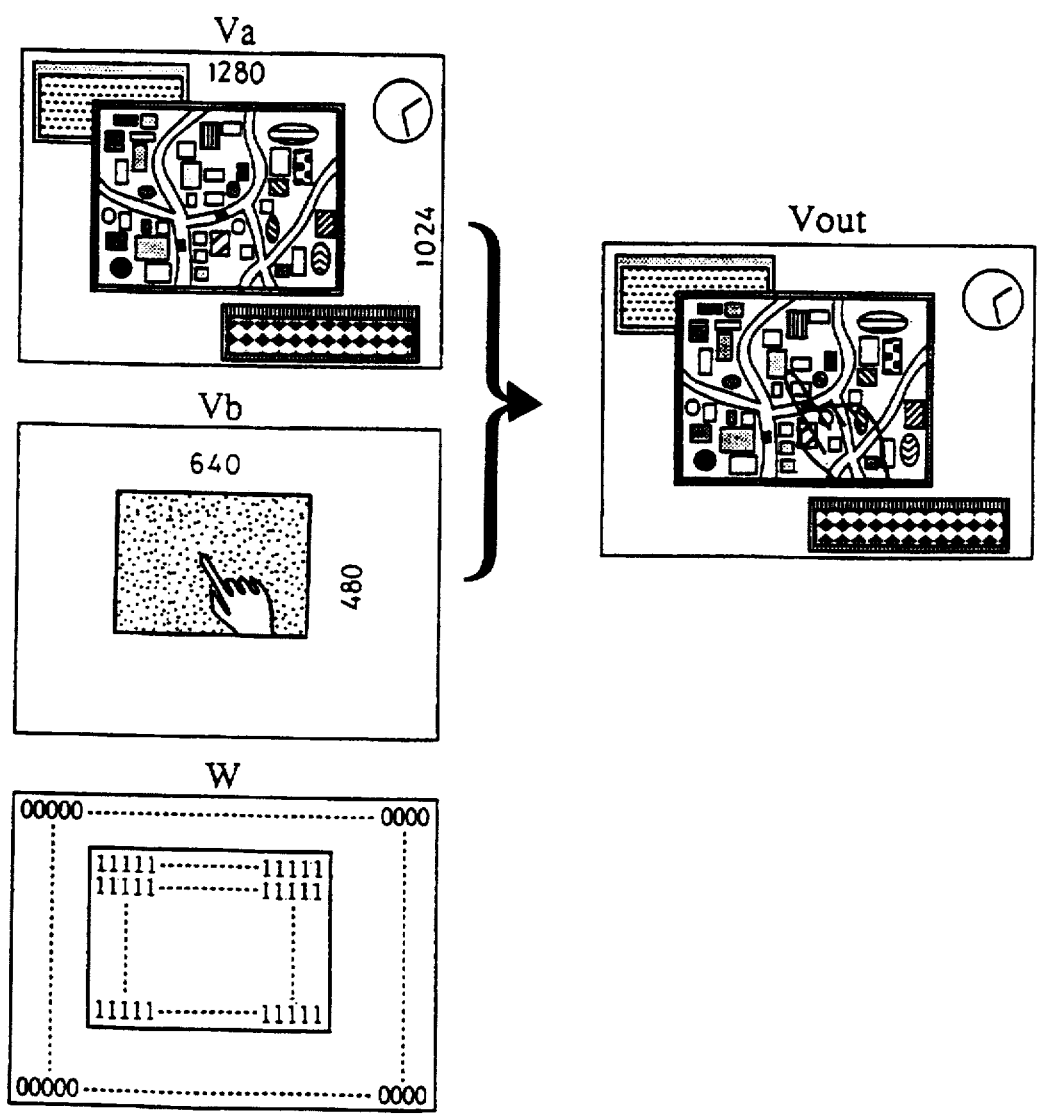
FIG. 3 explains how an image synthesizer of FIG. 1 operates.

FIG. 1 is an example in which an image synthesizer of a first example is incorporated into a multi-media workstation (not shown). This image synthesizer synthesizes images $V_a$ and $V_b$ for forming an image $V_{out}$. Image data $V_a$, $V_b$, W, and $V_{out}$ whose display images are shown in FIG. 3, are data for video display on a workstation visual display screen of 1280 by 1024 pixels. A pixel in $V_a$, $V_b$, and $V_{out}$ has 24-bit color data (i.e. 8-bits for R(ed), 8-bits for G(reen), and 8-bits for B(lue)). On the other hand, a pixel in W has 1-bit data. The application of $V_a$, $V_b$, and W to the synthesizer, which is timed by a sync clock signal, is carried out by the pixel in the order of non-interlaced scanning (i.e. a sort of scanning in which left-to-right scanning starts at an uppermost line on a screen; when it gets to the right end of the uppermost line, it then makes a transition to the left end of a second line just below the uppermost line; the second line is likewise subjected to a left-to-right scan; when it gets to the right end of the second line, it moves to the left end of a third line; the third line is then scanned from the left end to the right end; . . . , and so on). Such non-interlaced scanning, of course, is timed. A mixer 2 is fed input data A and input data B. In the mixer 2, each input data is assigned a weight, each input data is multiplied by its weight, and the results are summed. As a result, the mixer 2 gives an output Y (=aA+bB where "a" and "b" are a weight). Although, in the present example, the weights "a" and "b" are so set that a+b=1 and a=b=0.5, it is possible to assign other values to these weights (for example, a=0.4 and b=0.6, or a=0.8 and b=0.2).

Each of $V_a$ and $V_b$ consists of three 8-bit color components (i.e. 8-bit R, 8-bit G, and 8-bit B), so that the above-described weighted-summation is performed between the same color components, that is, between R's, between G's, and between B's. A condition detecting means 1 is fed input A and input B. The condition detecting means 1 sends out a coincidence signal when a match is found between the input data A and a requirement conditioned by the input data B. In the present example, the condition detecting means 1 is a comparator 20. The comparator 20 is fed input data A and input data B. The comparator 20 checks the input data A with the input data B, thereby outputting a coincidence signal of a logical 1 to an output Y when the input data A has a value inside a range defined by the input data B. A data selector 3 outputs an input signal A to an output Y when a selective signal is a logical 0 while on the other hand outputting an input signal B when a selective signal is a logical 1. An AND gate 4 performs an AND operation. D-type flip-flops 5, 6, 7, 8, and 9 hold and output input data on the leading edge of a clock pulse. Condition data $D_{con}$ is condition data to be fed into the comparator 20. In the present example, $D_{con}$ consists of 48 bits to assign a set of 8-bit upper- and lower-limits to each of R, G, and B of $V_b$ so as to determine an image data value range.

Figure 2:
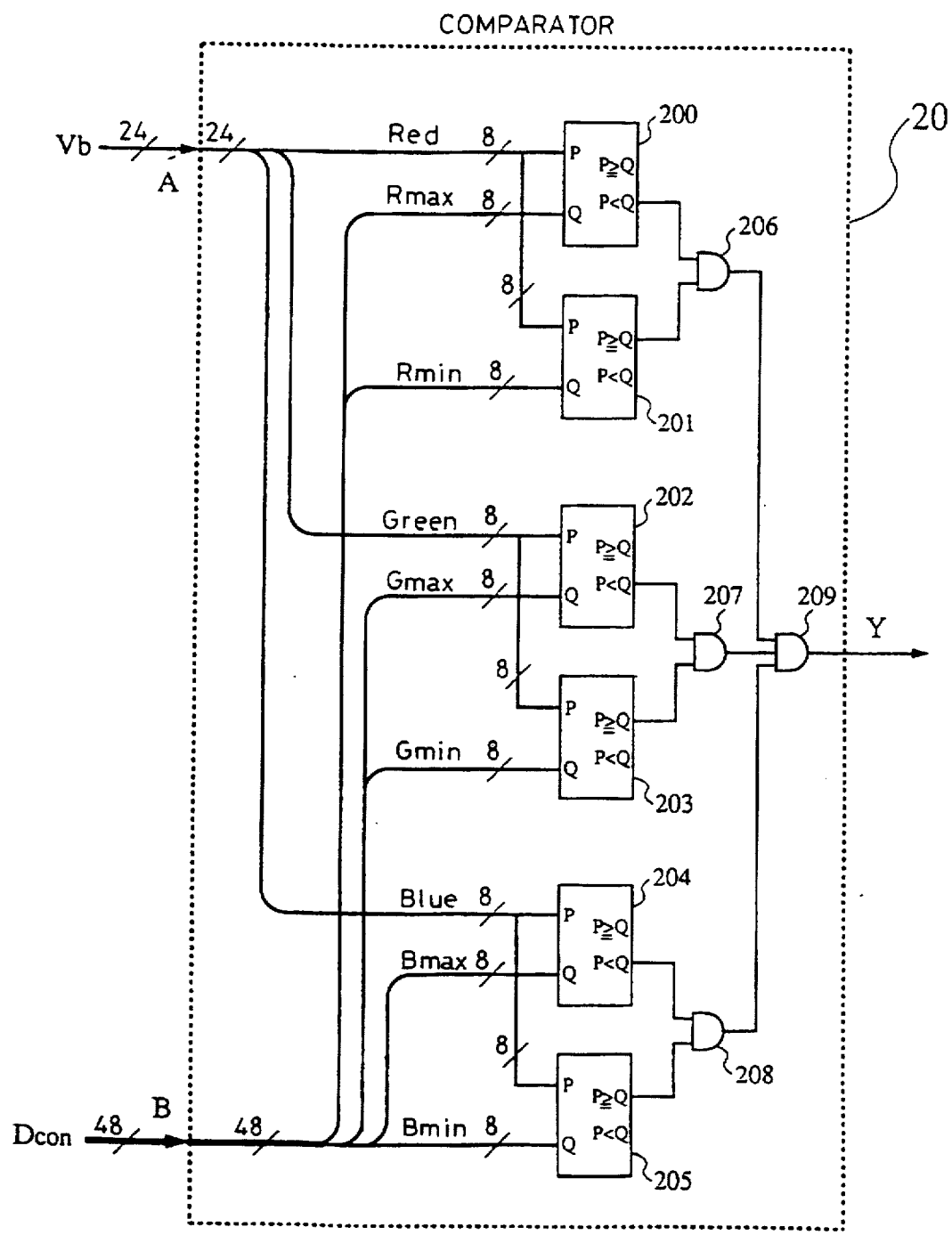
FIG. 2 is a circuit diagram showing the internal organization of a comparator of FIG. 1.

FIG. 2 shows the internal organization of the comparator 20. Magnitude comparators 200, 201, 202, 203, 204, and 205 are conventional magnitude comparators. Each magnitude comparator makes a comparison between the magnitude of input data P and that of input data Q. If P is equal to or greater than Q, P≧Q="1" and P<Q="0". If P is lower than Q, P≧Q="0" and P<Q="1". AND gates 206, 207, 208 and 209 are conventional AND gates. As seen from FIG. 2, the comparator 20 is fed $V_b$ of 24 bits (i.e. 8-bit R, 8-bit G, and 8-bit B) through the input A and $D_{con}$ of 48 bits (i.e. three 8-bit upper-limits $R_{max}$, $G_{max}$, and $B_{max}$ and three lower-limits $R_{min}$, $G_{min}$, and $B_{min}$) through the input B. The comparator 20 gives an output of a logical 1 only when the image pixel data value at the input A is:

$R_{min}$≦Red<$R_{max}$; $G_{min}$≦Green<$G_{max}$; and $B_{min}$≦Blue<$B_{max}$.

The comparator 20 otherwise gives an output of a logical 0.

The operation of the image synthesizer of FIG. 1 is now described. An image of $V_{out}$ of FIG. 3 is displayed on the screen as a final display image. FIG. 3 shows that $V_a$ is prepared by means of application software for multi-window system capable of running on the workstation (the development of $V_a$ actually takes place in a buffer memory). In the present example, a user A at a location A is going to explain the situation of land use in a city to a user B at a remote location. A "city block" is being captured by a video camera at the location A. As shown in FIG. 3, the video image thus captured is then transmitted to the location B over a CATV or the like for superimposition in a window (640 by 480 pixels). Meanwhile, a video camera at the location B is now shooting a hand of the user B. This allows for the user B to obtain information about a particular building from the user A by means of hand pointing. This pointing image ($V_b$) is shown in FIG. 3 (640 by 480 pixels). The pixel coordinate position of the "hand" is equal to that of the "city block" ($V_a$) so that these two images perfectly confirm in size with each other. FIG. 3 (W) is a visualized diagram of information indicative of an image synthesis inhibit area. More specifically, positions at which pixels, which are not subjected to synthesis processing, are placed are assigned logical 0's, while on the other hand, the remaining are assigned logical 1's. In the present example (FIG. 3), accordingly, an area used for image synthesis of the "city block" ($V_a$) and the "hand" ($V_b$) is assigned a logical 1.

$D_{con}$ is supplied with the upper and lower limits of color data covering a range necessary for representing colors of the "hand". More specifically, if a color data distribution range of the "hand" is: R=$R_{min}$ to $R_{max}$=01100001 to 10011010; G=$G_{min}$ to $G_{max}$=01000010 to 01011011; B=$B_{min}$ to $G_{max}$=00100110 to 00110001, and if a background image color lies outside such a range, 48-bit condition data to be applied to $D_{con}$ is set to: $D_{con}$=$R_{min}$ $R_{max}$ $G_{min}$ $G_{max}$ $B_{min}$ $B_{max}$=01100001 10011010 01000010 01011011 00100110 00110001.

In synchronization with a clock signal, $V_a$, $V_b$, and W are applied by the pixel to the D-type flip-flops 5, 6 and 7, respectively. The mixer 2 then translucently synthesizes $V_a$ and $V_b$, or performs addition of $V_a/2+V_b/2$ so as to output the result. The comparator 20, since $D_{con}$ is set as above, sends out a coincidence signal of a logical 1 only at the time when receiving a pixel used for forming the "hand". Since all the area except for the center logical 1 area is assigned a logical 0 (FIG. 3(W)), the AND gate 4 becomes "1" only at a particular area where the hand image is existent. In the D-type flip-flop 9, data such as $V_{out}$ (FIG. 3) appears at the output one clock pulse later.

If $V_{out}$ is displayed, the entire "city block" except for the "hand" serving as a pointer can be visible. Additionally, the present example eliminates the above-described drawback in the conventional translucent synthesis processing in which the entire city block image and the entire hand image are translucently synthesized. Accordingly, in accordance with present example, the "city block" will not become dim or too complicated to view. Furthermore, even the "city block" behind the "hand" can be seen clearly.

EXAMPLE II

Figure 4:
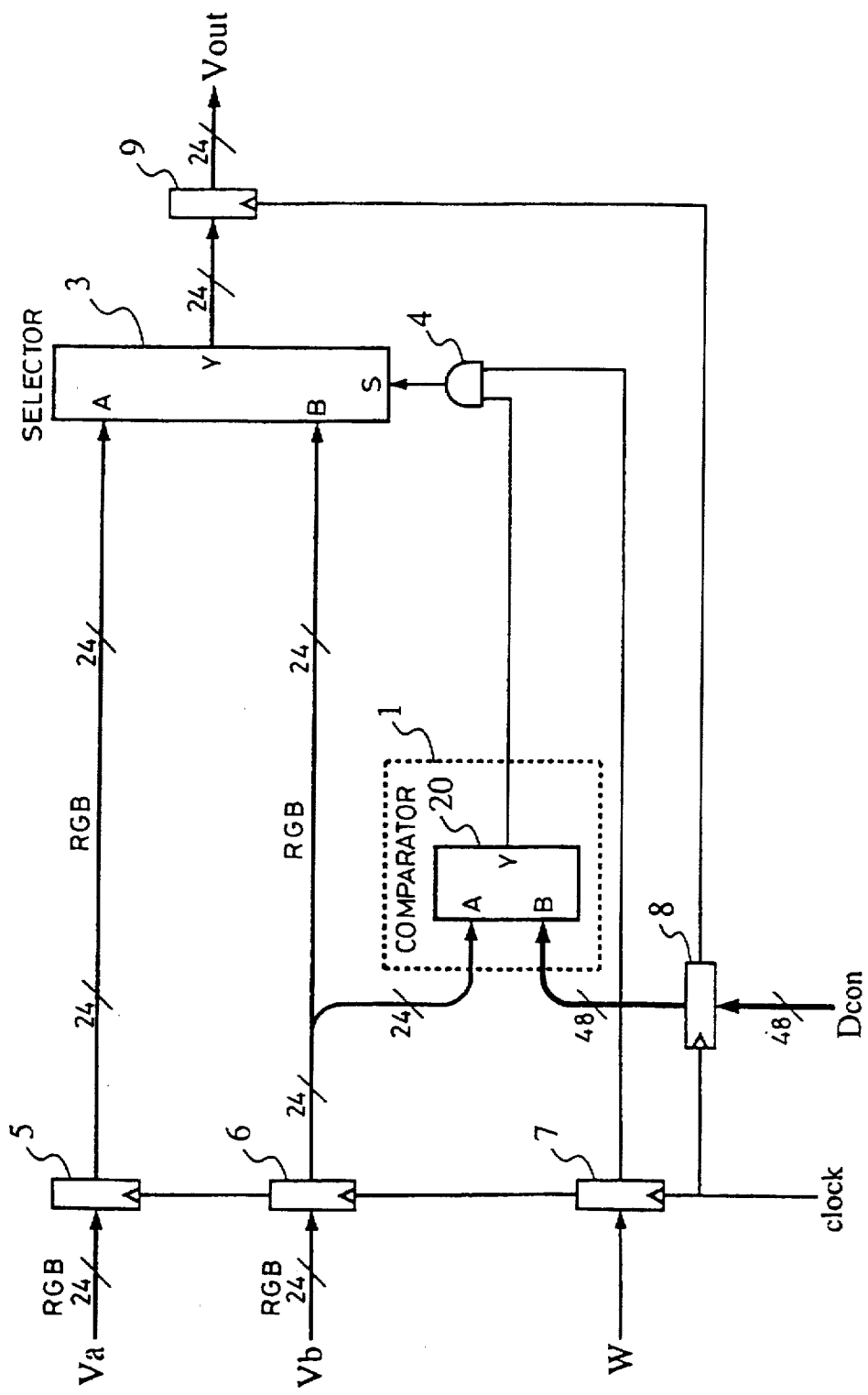
FIG. 4 is a schematic diagram showing an image synthesizer of a second example of the present invention.
Figure 5:
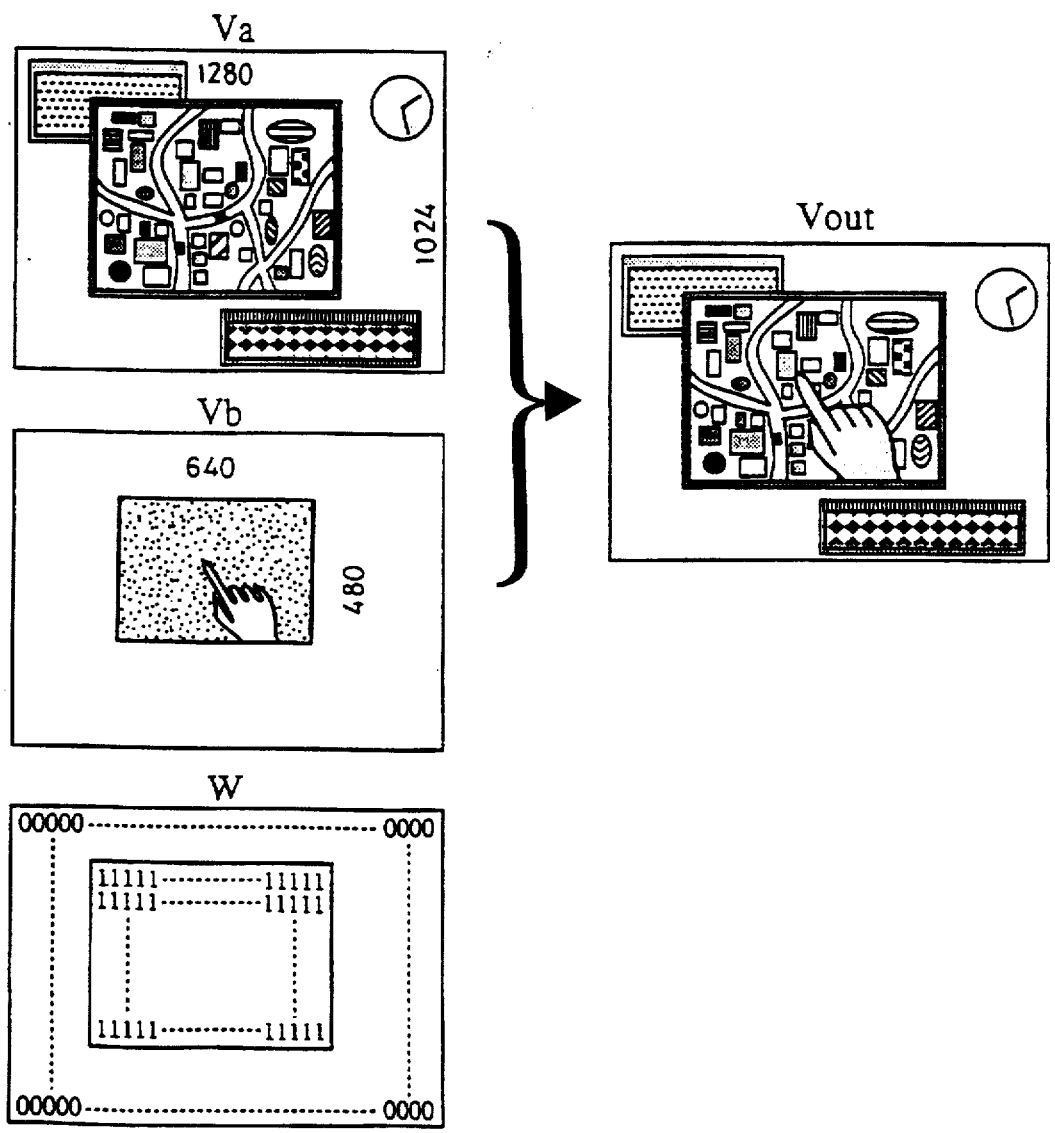
FIG. 5 explains how an image synthesizer of FIG. 4 operates.

In an image synthesizer of a second example (FIG. 4), the provision of the mixer 2 is omitted so that $V_a$, without passing through the mixer 2, is directly applied to the data selector 3. Other than this, the second image synthesizer and the first image synthesizer are identical in configuration to each other. $V_{out}$ (FIG. 5) by opaque synthesis of the "city block" and the "hand" is displayed on a multi-media workstation display screen as a final display image. In other words, the "hand" is displayed only at the time when a pixel used for forming the "hand" is received, and the "city block" is displayed on the other area. As a result, the entire "city block" other than the "hand" is visible. Further, the "city block" will not become dim or too complicated to view. Since an area permitted for synthetic image display is limited to within a window defined by the image-synthesis inhibit area data W, it is possible to prevent an unwanted object (for example, a pen on the desk) other than the "city block" and the "hand" in the two images shot from being displayed.

EXAMPLE III

Figure 6:
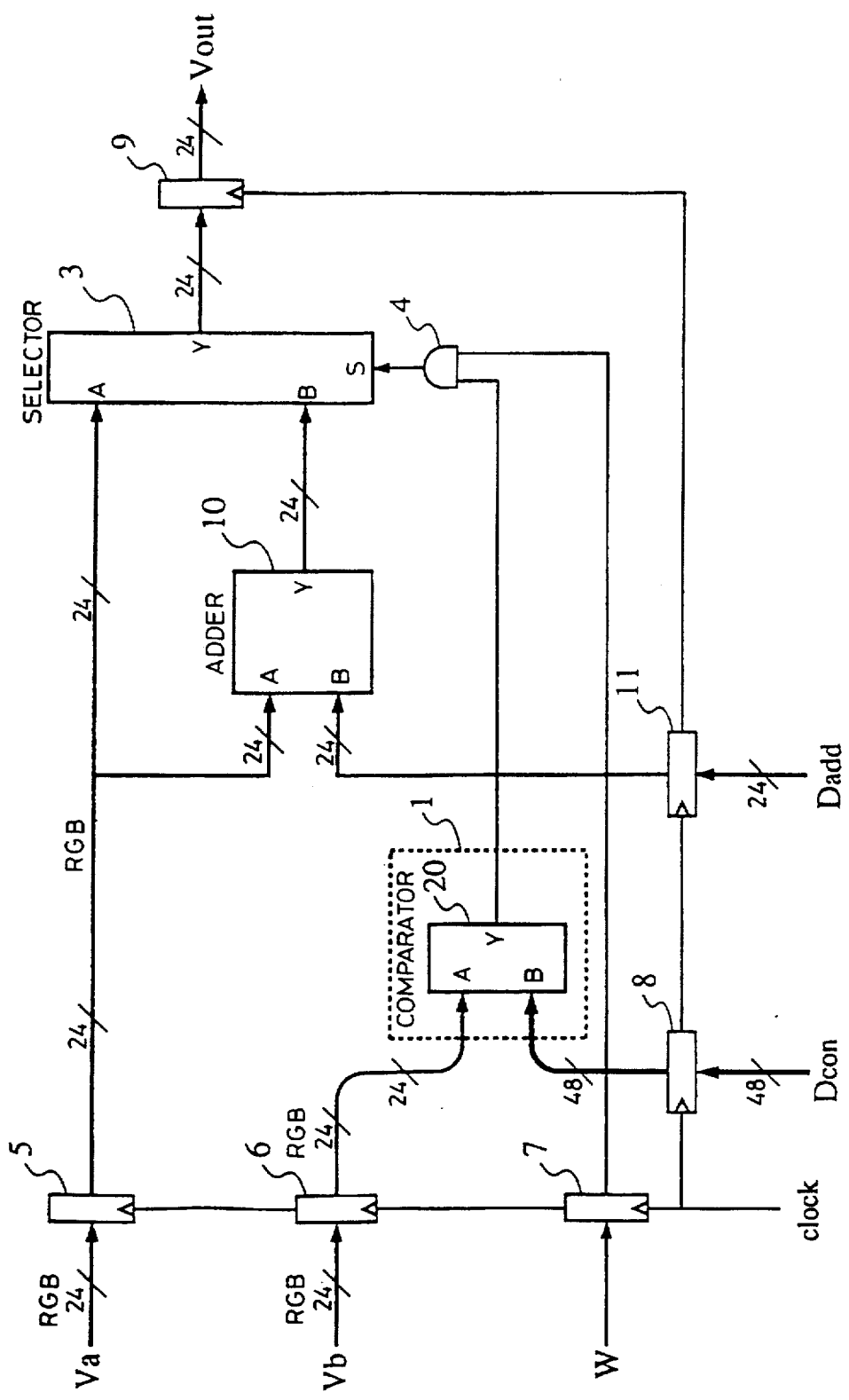
FIG. 6 is a schematic diagram showing an image synthesizer of a third example of the present invention.

An image synthesizer of a third example (FIG. 6) includes an adder 10 for performing addition of input data A and input data B and outputting the addition result. That is, the adder 10 performs summation of $V_a$ held at the D-type flip-flop 5 and an addition value $D_{add}$ set by means of software to an adequate value (i.e. $V_a+V_{add}$). $D_{add}$ to be fed into the adder 10 is a value held at a D-type flip-flop 11. The present image synthesizer and the first image synthesizer are identical in configuration to each other except for the adder 10 which replaces the mixer 2 of the first image synthesizer.

The adder 10 performs summation of ($V_a+D_{add}$) so as to shift the color of $V_a$ in the direction in which it ($V_a$) becomes brighter, thereby outputting the subtraction result. For example, if the adder 10 is fed $V_a$ of 01100110 11010011 01011101 and $D_{add}$ of 01000000 01000000 01000000, it gives an output Y of 10100110 (for R) 11111111 (for G) 10011101 (for B). If the addition result is in excess of 8 bits resulting in an overflow, this forces an overflown portion of Y to be assigned a maximum value of 11111111, as in the case of the above G portion.

The conversion result of $V_a$ by the adder 10 is selected only at the time when a pixel used for forming the "hand" serving as a pointer is taken in. As a result, a portion of the "city block" behind and corresponding to the "hand" can be seen with an outstanding brightness. Further, the entire "city block" except for the "hand" is visible, and the "city block" will not become dim or too complicated to view.

EXAMPLE IV

Figure 7:
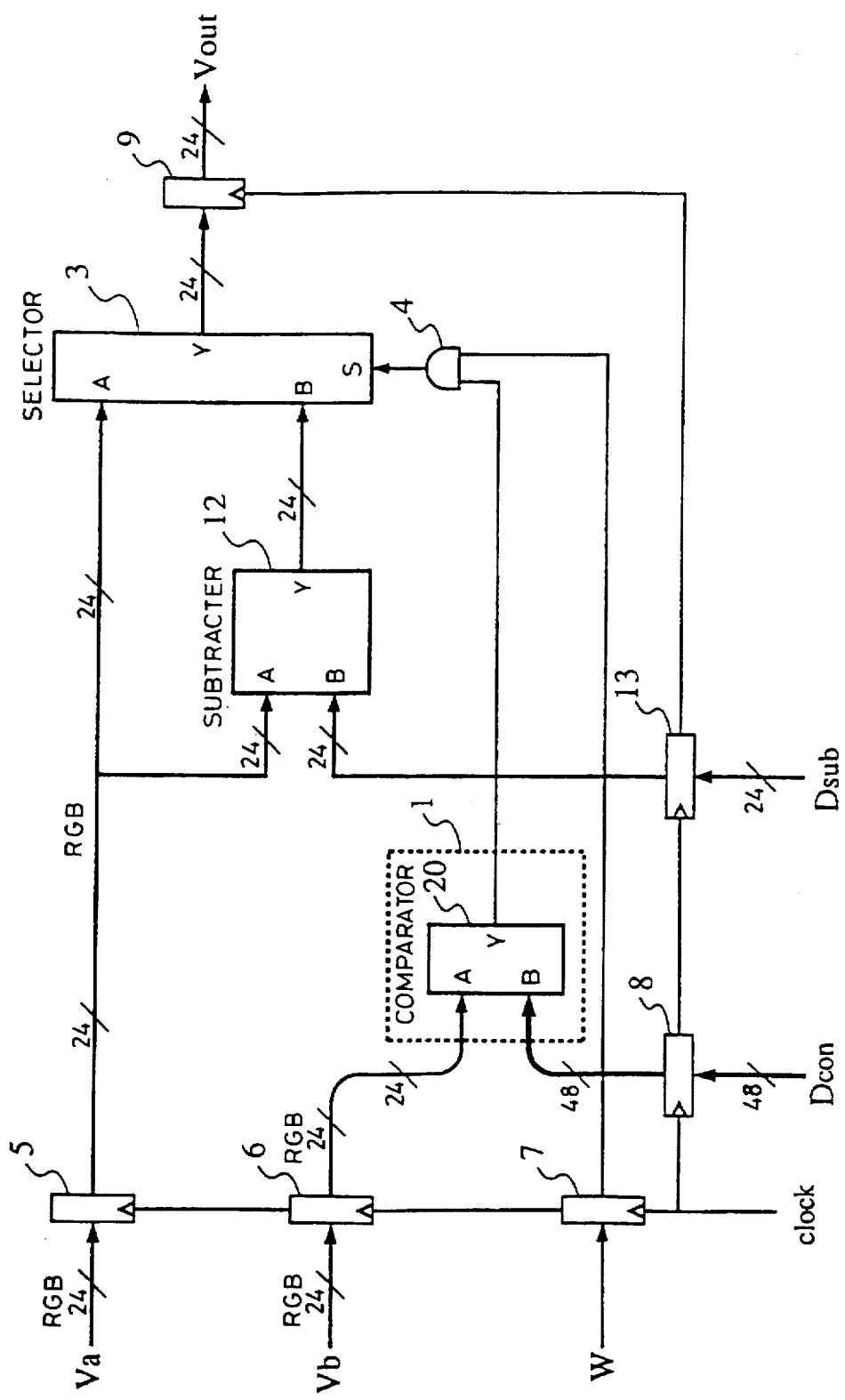
FIG. 7 is a schematic diagram showing an image synthesizer of a fourth example of the present invention.

An image synthesizer of a fourth example (FIG. 7) includes a subtracter 12 for performing subtraction of input data B from input data A and outputting the subtraction result. That is, the subtracter 12 performs subtraction of a subtraction value $D_{sub}$ softwarily set to an adequate value from $V_a$ held at the D-type flip-flop 5 (i.e. $V_a-D_{sub}$). $D_{sub}$ to be fed into the subtracter 12 is a value held at a D-type flip-flop 13. The present image synthesizer and the third image synthesizer are identical in configuration to each other except for the subtracter 12 which replaces the adder 10 of the third image synthesizer.

The subtracter 12 performs subtraction of ($V_a-D_{sub}$) to shift the color of $V_a$ in the direction in which it (the color of $V_a$) becomes darker, thereby outputting the result. For example, If the subtracter 12 is fed $V_a$ of 11100110 00110011 01011101, and $D_{sub}$ of 01000000 01000000 01000000, it gives an output Y of 10100110 00000000 00011101. If the subtraction result is below 8 bits resulting in an underflow, this forces an underflown portion of Y to be assigned a minimum value of 00000000, as in the case of the above G portion.

The conversion result of $V_a$ by the subtracter 12 is selected only at the time when a pixel used for forming the "hand" serving as a pointer is taken in. As a result, a portion of the "city block" behind and corresponding to the "hand" can be seen with an outstanding darkness. Further, the entire "city block" except for the "hand" is visible, and the "city block" will not become dim or too complicated to view.

EXAMPLE V

Figure 8:
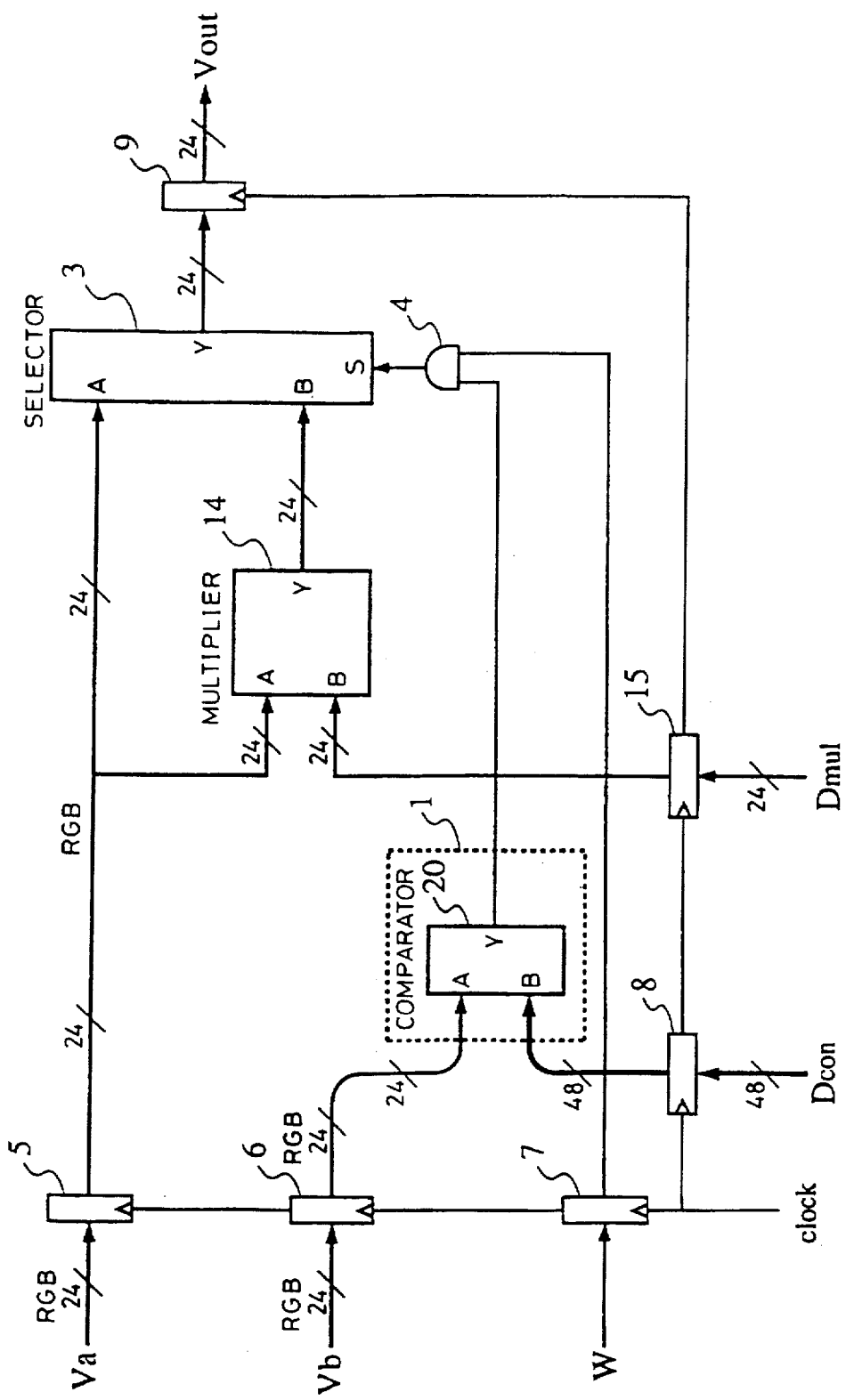
FIG. 8 is a schematic diagram showing an image synthesizer of a fifth example of the present invention.

An image synthesizer of a fifth example (FIG. 8) includes a multiplier 14 for performing multiplication of input data A by input data B and outputting the multiplication result. That is, the multiplier 14 performs multiplication of $V_a$ held at the D-type flip-flop 5 times a multiplication value $D_{mul}$ set by software to an adequate value (i.e. $V_a \times D_{mul}$). $D_{mul}$ to be fed into the multiplier 14 is a value held at a D-type flip-flop 15. The present image synthesizer and the third image synthesizer are identical in configuration to each other except for the multiplier 14 which replaces the adder 10 of the third example.

The multiplier 14 performs multiplication of $V_a$ by $D_{mul}$ to amplify the color of $V_a$ in the direction in which it (the color of $V_a$) becomes brighter, or to damp it in the direction in which it becomes darker, thereby outputting the result. $D_{mul}$, in agreement with R, G, and B, consists of three sets of 8-bit values with each high-order 4-bit as an integer part and each low-order 4-bit as a fraction part. In other words, each value is a fixed-point number with a virtual binary point between an integer part and a fraction part. For example, 00100000 is equivalent to the decimal number 2.0, and 00000100 is equivalent to the decimal number 0.25. If the multiplier 14 is fed $V_a$ of 01100110 11010011 01011101, and $D_{mul}$ of 00100000 00100000 00100000, it gives an output Y of 11001100 11111111 10111010. As a result of this, $V_a$ becomes brighter. If the multiplication result is in excess of 8 bits resulting in an overflow, however, this forces an overflown portion of Y to be assigned a maximum value of 11111111 as in the case of the above G portion. If the multiplier 14 is fed $V_a$ of 01100110 00000010 11011101, and $D_{mul}$ of 00000100 00000100 00000100, it gives an output Y of 00011001 00000000 00110111. In this case, conversely, $V_a$ becomes darker. If the result is below 8 bits, however, this forces an underflown portion of Y to be assigned a minimum value of 00000000, as in the case of the above G portion.

The conversion result of $V_a$ by the multiplier 14 is selected only at the time when a pixel used for forming "hand" serving as a pointer is taken in. As a result, a portion of the "city block" behind and corresponding to the "hand" can be seen with an outstanding brightness or darkness. Further, the entire "city block" except for the "hand", is visible, and the "city block" will not become dim or too complicated to view.

EXAMPLE VI

Figure 9:
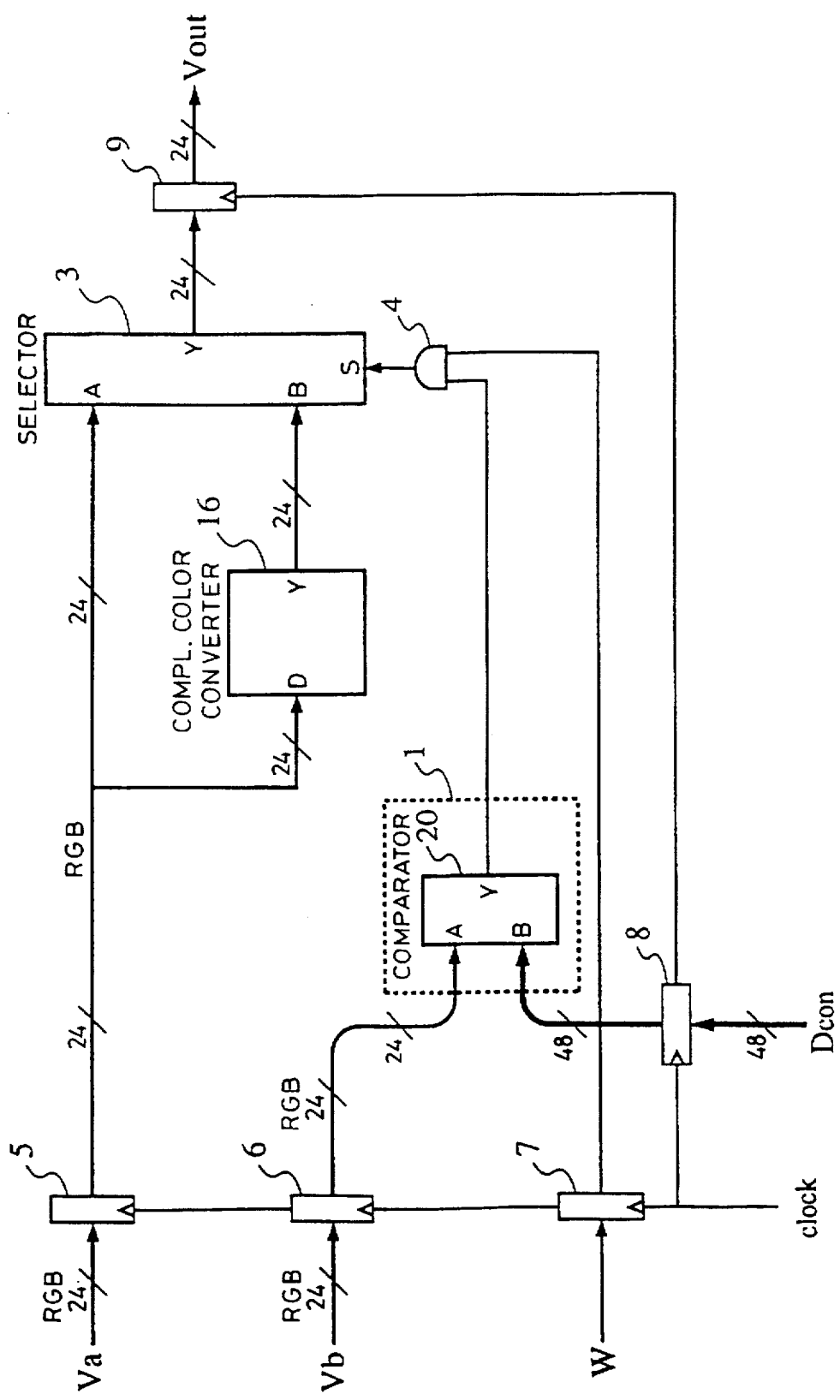
FIG. 9 is a schematic diagram showing an image synthesizer of a sixth example of the present invention.

An image synthesizer of a sixth example, shown in FIG. 9, includes a complementary color converter 16. The complementary color converter 16 is fed $V_a$ and outputs data which represents a complementary color opposed to $V_a$. The present image synthesizer and the third image synthesizer are identical in configuration to each other except for the complementary color converter 16 which replaces the adder 10 of the third image synthesizer.

The complementary color converter 16 inverts each bit of $V_a$ thereby outputting data representing a complementary color to the color of $V_a$. For example, if the complementary color converter 16 is fed $V_a$ of 01100110 11010011 01011101, it gives an output Y of 10011001 00101100 10100010.

The conversion result of $V_a$ by the complementary color converter 16 is selected only at the time when a pixel used for forming the "hand" serving as a pointer is taken in. As a result, a portion of the "city block" behind and corresponding to the "hand" can be seen with an outstanding complementary color to the other portion. Further, the entire "city block" except for the "hand" is visible, and the "city block" will not become dim or too complicated to view.

EXAMPLE VII

Figure 10:
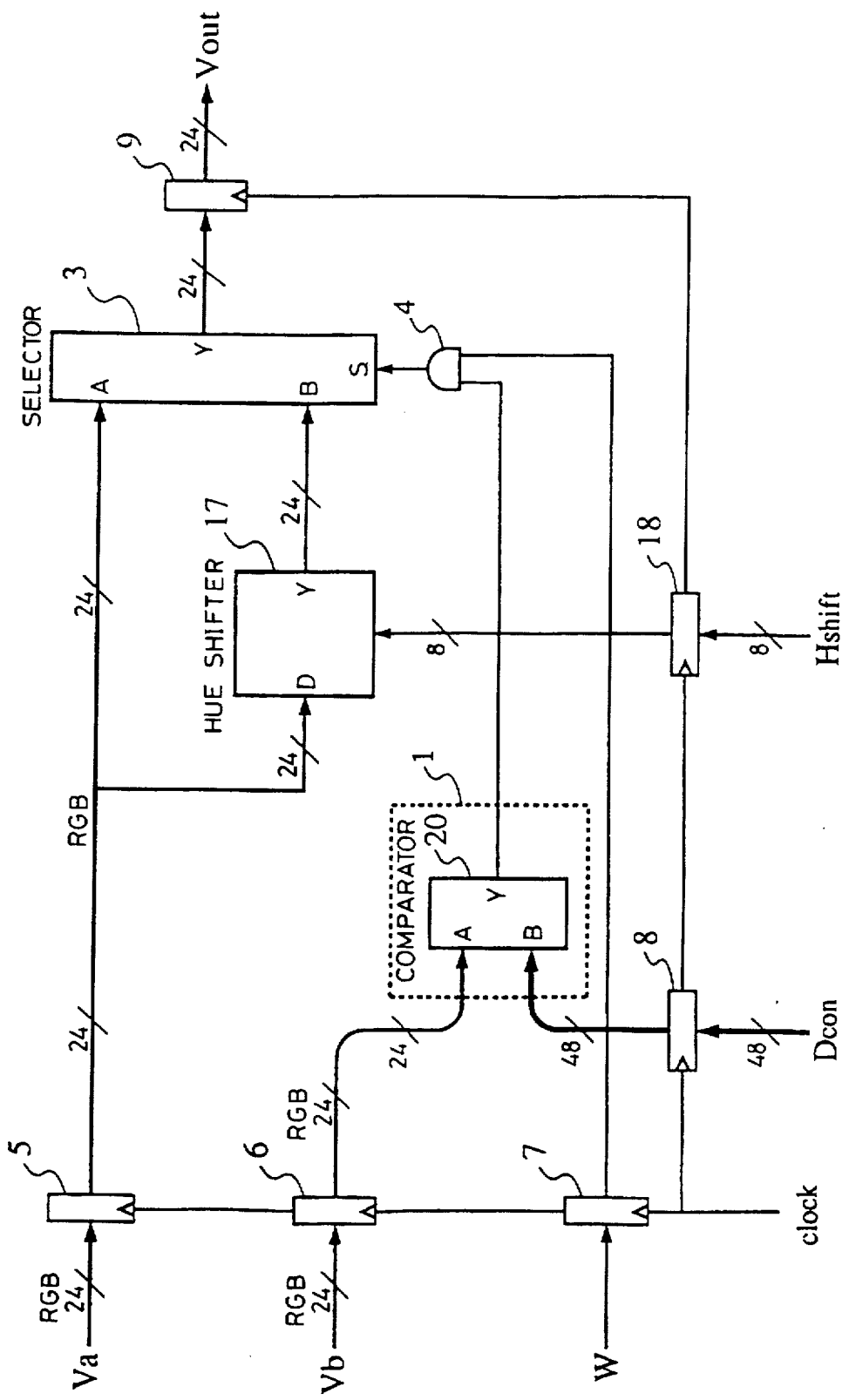
FIG. 10 is a schematic diagram showing an image synthesizer of a seventh example of the present invention.

An image synthesizer of a seventh example, shown in FIG. 10, includes a hue shifter 17. The hue shifter 17 shifts the hue of $V_a$ held at the D-type flip-flop 5 by an amount proportional to a hue shit parameter $H_{shift}$ which is set by software to an adequate value. The hue shifter 17 can be realized by a circuit formed by connecting in series a matrix circuit (with a hue shift) for the conversion of RGB data into YCrCb data (luminance Y and chrominance signals Cr and Cb) and a standard backward matrix circuit for the conversion of YCrCb data into RGB data. $H_{shift}$ to be fed into the hue shifter 17 is a value held at a D-type flip-flop 18. The present example and the third example are identical in configuration to each other except for the hue shifter 17 which replaces the adder 10 of the third example.

The hue shifter 17 shifts the hue of $V_a$ by an amount proportional to $H_{shift}$ to convert the color of $V_a$ into a different color. $H_{shift}$ made up of 8 bits, is a fixed-point number with a virtual binary point between the high-order 4 bits and the low-order 4 bits. When fed H-shift of 00010000 equivalent to the decimal number 1.0, the hue shifter 17 shifts or rotates the hue of $V_a$ an angle of 30 degrees. For instance, if $V_a$ is red, and if $H_{shift}$=01000000 equivalent to the decimal number 4.0 (a rotation of 120 degrees), the hue shifter 17 gives an output Y of green. If $V_a$ is red, and if $H_{shift}$=00100000=2.0 in decimal notation (a rotation of 60 degrees), the hue shifter 17 gives an output Y of yellow.

The conversion result of $V_a$ by the hue shifter 17 is selected only at the time when a pixel used for forming the "hand" serving as a pointer is taken in. As a result, a portion of the "city block" behind and corresponding to the "hand" can be seen with an outstanding color produced by a hue shift by a desired angle. Further, the entire "city block" except for the "hand" is visible, and the "city block" will not become dim or too complicated to view.

EXAMPLE VIII

Figure 11:
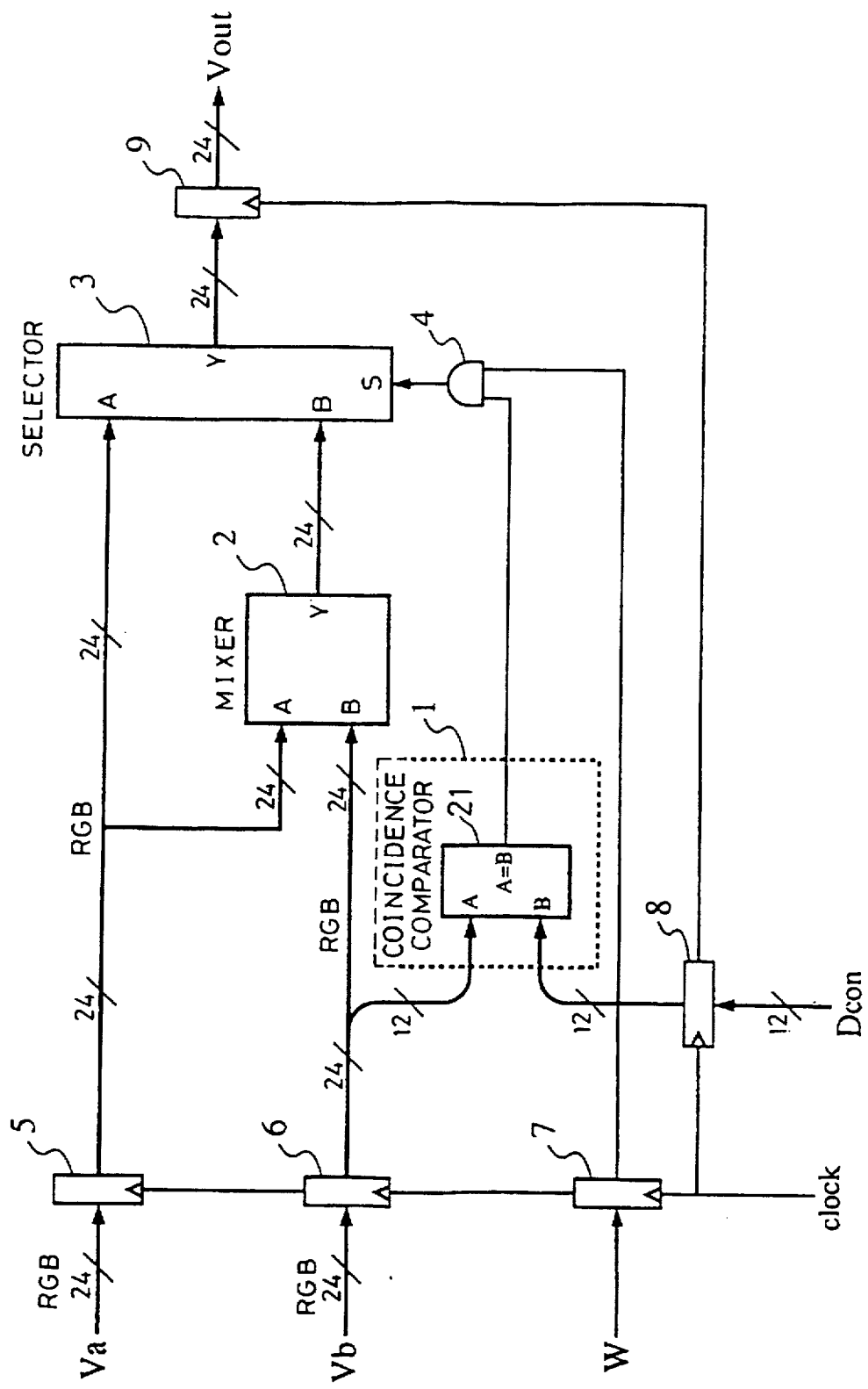
FIG. 11 is a schematic diagram showing an image synthesizer of an eighth example of the present invention.

An image synthesizer of an eighth example (FIG. 11) is identical to an image synthesizer of the first example except that the present example employs a coincidence comparator 21 instead of using the condition detecting means 1 of FIG. 1. Accordingly, the present image synthesizer operates the same way that the first image synthesizer does.

The comparator 20 (FIG. 1) used to specify the position of pixels used for forming the "hand" is a window comparator for making a decision on the color range of $V_b$. The comparator 20 requires $D_{con}$ of 48 bits ($R_{min}$ $R_{max}$ $G_{min}$ $G_{max}$ $B_{min}$ $B_{max}$) as its input. The coincidence comparator 21 is a conventional coincidence comparator, wherein a coincidence signal output (A=B) becomes a logical 1 when each bit of input data A and each bit of input data B agree with each other, and when they disagree with each other, (A=B) becomes a logical 0. $D_{con}$ is only fed each high-order half (i.e. 4 bits) of 8-bit R, G, and B covering the color range of the "hand" (i.e. 12 bits in total). For example, if a color data distribution range of the "hand" is: R=01100001 to 01101100; G=01000010 to 01001011; and B=00110110 to 00111001, and if the color of a background other than the "hand" is outside such a range, such 12 bits of the $D_{con}$ are set to 0110 0100 0011. Since only each high-order 4 bits of R, G, and B of $V_b$ are subject to comparison, it is possible to specify a wide color range by means of the coincidence comparator 21 with a simple configuration although such a range is a fixed one. If $D_{con}$=0110 0100 0011, required conditions for an equal comparison are that $V_b$ must lie within a color range of: R=01100000 to 01101111, G=01100000 to 01101111, and B=00110000 to 00111111. The color range varies, depending upon the number of bits subject to comparison, that is, the range will expand if the number of bits subject to comparison is small while it narrows if it is large.

In the foregoing first to eighth examples, the comparator 20 or the coincidence comparator 21 is so configurated that the position of pixels used for forming the "hand" is specified by $D_{con}$. However, conversely, it is possible to specify the position on the basis of condition data as to a background color, which finds it advantageous at the time when the color range of a background (for example, a blue-back background) can be selected easily compared to the "hand".

EXAMPLE IX

Figure 12:
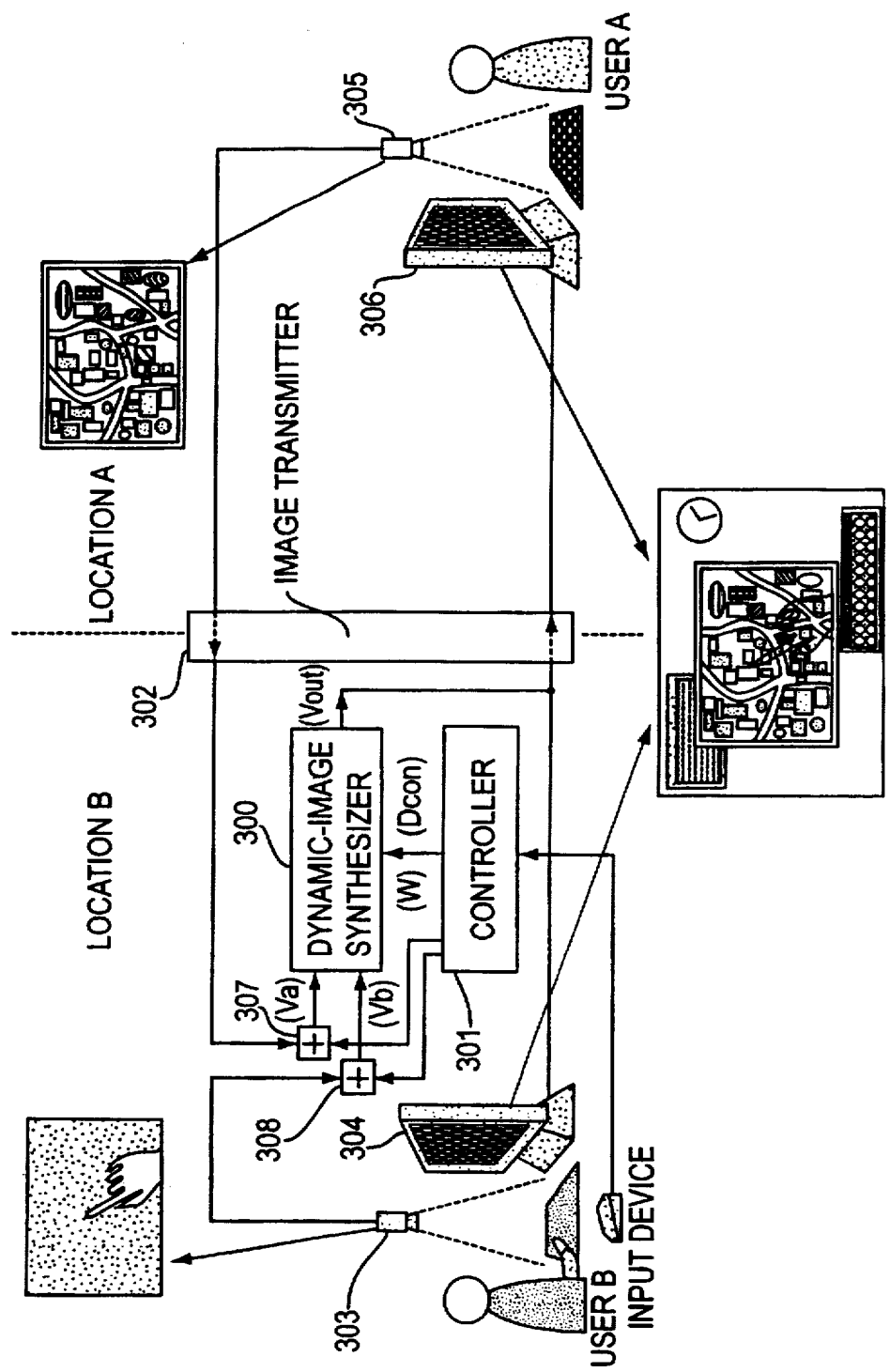
FIG. 12 is a schematic diagram showing an image pointing system of a ninth example of the present invention.

With reference to FIG. 12, an image pointing system is described. FIG. 12 shows a scene in which a user B at a location B points with his or her finger a particular thing out on a city block image transmitted from a user A at a location A. 300 is an image synthesizer in accordance with the present invention. 301 is a controller for controlling the image synthesizer 300. The controller 301 is formed by elements such as a CPU, a memory, and an input/output port. The I/O port of the controller 301 is connected to an input device such as a mouse and a keyboard. 303 and 305 are image input means such as video cameras. At the location A, a VTR or a laser disk, instead of a video camera, may be used. 304 and 306 are visual display means for video display. Here, the display means 304 and 306 are full-color display units having a resolution of 1280 by 1024 pixels. 302 is an image transmitting means for bi-directional transfer. The image transmitting means 302 may be realized by a CATV when transmission is limited to between neighboring buildings or by means of an ISDN in the case of remote transmission. 307 and 308 are image superimposing means for the superimposition of video images (640 by 480 pixels) transmitted respectively from the video cameras 303 and 305 on a workstation graphic screen. Such a superimposing means can be realized by a circuit capable of selecting between video signals at the pixel rate. The outputs of the image superimposing means 307 and 308 become images of $V_a$ and $V_b$ as shown in FIG. 3.

The operation of an image pointing system of FIG. 12 is now explained. In the first place, the video camera 305 at the location A captures an image of a city block for transmitting it to the user B at a distance. The "city block" shot by the video camera 305 is then transmitted to the user B over the image transmitting means 302. At the location B, the "city block" is superimposed on the graphic display screen by the superimposing means 307, which is a first input $V_a$ of the image synthesizer 300. The user B at the location B, on the other hand, moves his or her hand (finger) over, for example, a blue pad for pointing. This pointing scene by the user B is shot by the video camera 303 and is fed into the image superimposing means 308 for video display on the workstation screen. At this point in time, the controller 301 exerts control so that the position of the "hand" from the video camera 303 confirms in position with that of the "city block" from the video camera 305 within the workstation screen. The superimposing means 308 is capable of the superimposition of an input image on any kind of graphics with a desired pattern. In the present example, an input image is superimposed on a white graphic screen (in actuality, any kind of graphic patterns can be used, since only the "hand" portion is displayed). The "city block" is a second input $V_b$ of the image synthesizer 300.

The image synthesizer 300 is fed $V_a$ and $V_b$ (i.e. the "city block" and the "hand"). The "city block" is arranged in an area corresponding to the blue pad while the "hand" and a corresponding portion of the "city block" are evenly translucently synthesized. The result is output as $V_{out}$. The display 304 at the location B displays $V_{out}$ from the image synthesizer 300. The display 306 at the location A receives $V_{out}$ via the image transmitting means 302 and displays it.

In accordance with the image pointing system of the present example, users at different locations can share a sharp video image containing pointing information by using one of the image synthesizers of the first to eighth examples. Accordingly, this gives users in different locations the feeling of being in the same location.

EXAMPLE X

Figure 13:
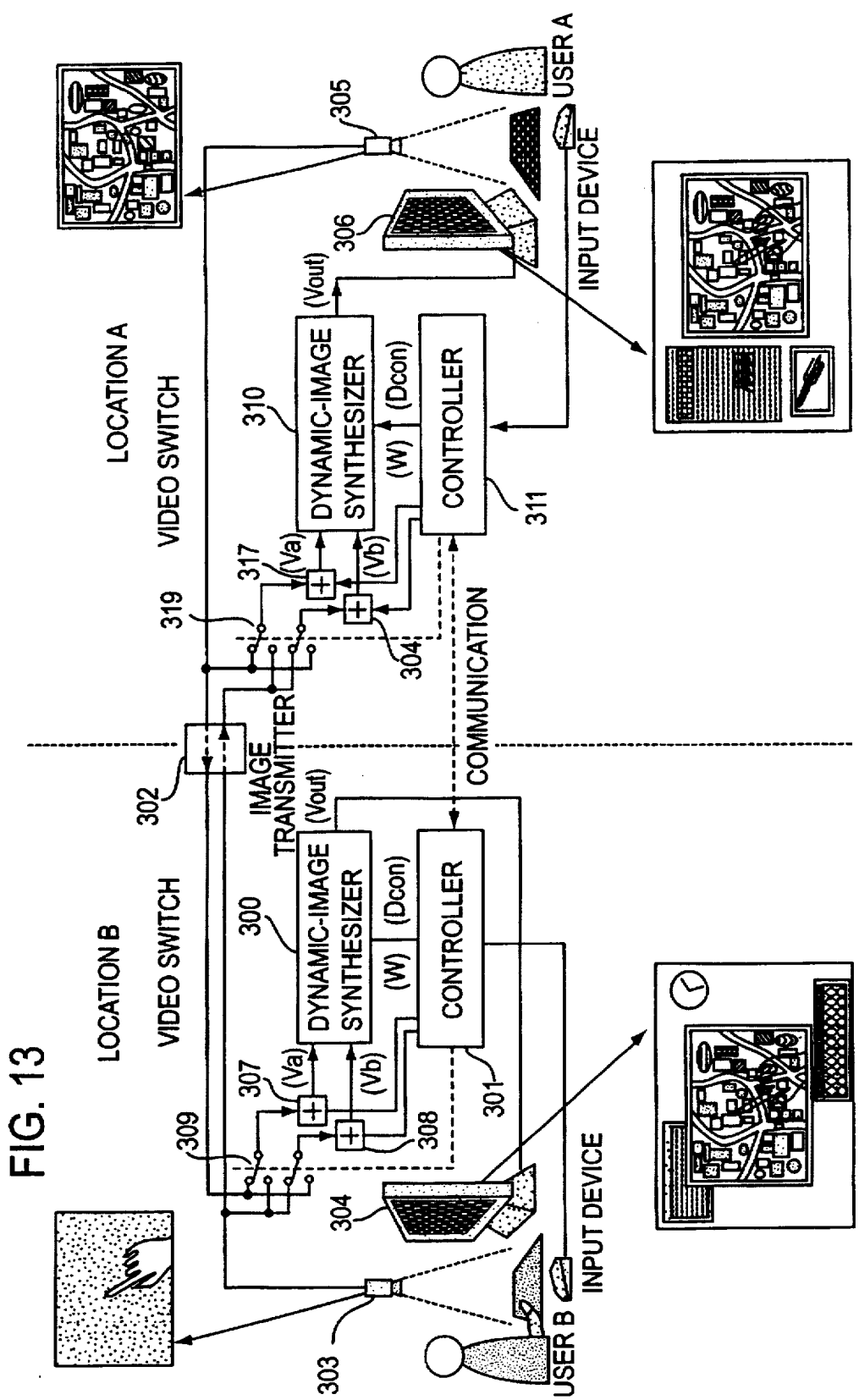
FIG. 13 is a schematic diagram showing an image pointing system of a tenth example of the present invention.

FIG. 13, which shows an image pointing system of a tenth example, is similar to FIG. 12. In FIG. 13, however, each user has the same facility that the other does. This makes the user A, too, capable of pointing action by means of a video switch. The same elements are indicated by the same reference numerals. 310 is an image synthesizer identical to the image synthesizer 300. 311 is a controller identical to the controller 301. 317 and 318 are image superimposing means identical to the image superimposing means 307 and 308. 309 and 319 are video switches for switching between video image inputs. Linkage between the controllers 301 and 311 can be established by means of a network. With such a network, the size, position and various parameters of a synthetic image are exchanged for the link operation of both the workstations.

If the states of the video switches 309 and 319 are ones as shown in FIG. 13, the "city block" from the user A and the "hand" from the user B are applied to each image synthesizer as the first input $V_a$ and as the second input $V_b$, respectively. As a result, a translucently synthesized image (for example, a "user B's hand-over-user A's city block" image) is displayed on a window of the display 304 as well as on a window of the display 306. If the states of the video switches 309 and 309 of FIG. 13 are reversed, a translucently synthesized image (for example, a "user A's hand-over-user B's city block" image) is displayed on a window of the display 304 as well as on a window of the display 306.

In accordance with the image pointing system of the present example, like the ninth example, users at different locations can share a sharp video image containing pointing information. Additionally, pointing action is possible at each location. Accordingly, this gives users in different locations the feeling of being in the same location.

In the foregoing examples, the "block city" subject to pointing is a static image. If a dynamic image, reproduced from a video image source such as a VTR and a laser disk, is used as an image subject to pointing, this creates more sophisticated telecommunication.

The invention claimed is:

1. An image synthesizer for obtaining pixel data of an image as a result of synthesis of a first image and a second image in synchronization with a clock signal, said image synthesizer comprising:

(a) a mixing circuit for assigning a weight to pixel data of the first image as well as to pixel data of the second image, each pixel data being fed in synchronization with a clock signal, multiplying each pixel data by its weight assigned, summing the results, and outputting resulting pixel data, said weight being greater than 0 and less than 1, (b) condition detecting means for sending out a coincidence signal when a match is found between pixel data of the second image and a requirement defined by given condition data, said condition data defining an allowable color range for each color of the pixel data of said second image, and (c) a data selector for performing a selective outputting function of outputting pixel data output from said mixing circuit when said condition detecting means sends out a coincidence signal, or of outputting otherwise pixel data of the first image.

2. An image synthesizer as in claim 1, wherein said condition detecting means includes a comparator which receives condition data describing a pixel data value range and outputs a coincidence signal when pixel data of the second image has a value which falls within the aforesaid pixel data value range.

3. An image synthesizer as in claim 1, wherein said condition detecting means includes a coincidence comparator for sending out a coincidence signal when at least a part of bits of pixel data of the second image agrees with given condition data.

4. An image synthesizer as in claim 1, wherein said data selector receives, in agreement with pixel data of the first image as well as with pixel data of the second image and in synchronization with a clock signal, image-synthesis inhibit area data indicative of an image-synthesis inhibit area where the synthesizing of the first and second images is inhibited, and performs a selective outputting function of outputting pixel data output from said mixing circuit when image-synthesis inhibit area data received indicates that a particular area is available for synthesis display and when said condition detecting means sends out a coincidence signal, or of outputting otherwise pixel data of the first image.

5. An image pointing system wherein an image captured at a location A is added pointing information at a remote location B, thereafter being simultaneously displayed at each location, said image pointing system comprising:

(a) image transmitting means for bi-directional communication between the location A and the location B, (b) first image inputting means provided at the location A for inputting a first image subject to pointing, (c) second image inputting means provided at the location B for inputting a second image serving as a pointer on the first image transmitted from the location A via said image transmitting means, (d) an image synthesizer provided at the location B for obtaining pixel data of an image by synthesis of the first image transmitted from the location A via said image transmitting means and the second image input through said second image inputting means, (e) first displaying means provided at the location B for displaying a pixel data output of said image synthesizer, and (f) second displaying means provided at the location A for displaying a pixel data output of said image synthesizer transmitted via said image transmitting means, said image synthesizer including:

(i) condition detecting means for sending out a coincidence signal when a match is found between pixel data of the second image and a requirement defined by given condition data, said condition data defining an allowable color range for each color of the pixel data of said second image, and (ii) a data selector for receiving, in agreement with pixel data of the first image as well as with pixel data of the second image, image-synthesis inhibit area data indicative of an image-synthesis inhibit area where the synthesizing of the first and second images is inhibited, and for performing a selective outputting function of outputting pixel data on the basis of the second image when image-synthesis inhibit area data received indicates that a particular area is available for synthesis display and when said condition detecting means sends out a coincidence signal, or of outputting otherwise pixel data of the first image.

6. An image pointing system wherein an image captured at a location A is added pointing information at a remote location B. thereafter being simultaneously displayed at each location, said image pointing system comprising:
- (a) image transmitting means for bi-directional communication between the location A and the location B.
- (b) first image inputting means provided at the location A for inputting a first image subject to pointing.
- (c) second image inputting means provided at the location B for inputting a second image serving as a pointer on the first image transmitted from the location A via said image transmitting means.
- (d) a first image synthesizer provided at the location B for obtaining pixel data of an image by synthesis of the first image transmitted from the location A via said image transmitting means and the second image input from said second image inputting means.
- (e) first displaying means provided at the location B for displaying a pixel data output of said first image synthesizer.
- (f) a second image synthesizer provided at the location A for obtaining pixel data of an image by synthesis of the first image input through said first image inputting means and the second image transmitted from the location B via said image transmitting means, and
- (g) second displaying means provided at the location A for displaying pixel data of said second image synthesizer.

said first and second image synthesizers each including:
- (i) condition detecting means for sending out a coincidence signal when a match is found between pixel data of the second image and a requirement defined by given condition data, said condition data defining an allowable color range for each color of the pixel data of said second image.
- (ii) data selecting means for receiving, in agreement with pixel data of the first image as well as with pixel data of the second image, image-synthesis inhibit area data indicative of an image-synthesis inhibit area where the synthesizing of the first and second images is inhibited and for performing a selective outputting function of outputting pixel data on the basis of the second image when image-synthesis inhibit area data received indicates that a particular area is available for synthesis display and when said condition detecting means sends out a coincidence signal, or of outputting otherwise pixel data of the first image.

7. An image pointing system wherein an image captured at a location A is added pointing information at a remote location B. thereafter being simultaneously displayed at each location, said image pointing system comprising:

image transmitting means for bi-directional communication between the location A and the location B.

first image inputting means provided at the location A for inputting a first image subject to pointing.

second image inputting means provided at the location B for inputting a second image serving as a pointer on the first image transmitted from the location A via said image transmitting means.

an image synthesizer provided at the location B for obtaining pixel data of an image by synthesis of the first image transmitted from the location A via said image transmitting means and the second image input through said second image inputting means.

first displaying means provided at the location B for displaying a pixel data output of said image synthesizer, and second displaying means provided at the location A for displaying a pixel data output of said image synthesizer transmitted via said image transmitting means, said image synthesizer including:
- a mixing circuit for assigning a weight to pixel data of the first image as well as to pixel data of the second image, each pixel data being fed in synchronization with a clock signal, multiplying each pixel data by its weight assigned, summing the results, and outputting resulting pixel data, said weight being greater than 0 and less than 1.
- condition detecting means for sending out a coincidence signal when a match is found between pixel data of the second image and a requirement defined by given condition data, said condition data defining an allowable color range for each color of the pixel data of said second image, and
- a data selector for performing a selective outputting function of outputting pixel data output from said mixing circuit when said condition detecting means sends out a coincidence signal, or of outputting otherwise pixel data of the first image.

8. An image pointing system wherein an image captured at a location A is added pointing information at a remote location B. thereafter being simultaneously displayed at each location, said image pointing system comprising:

image transmitting means for bi-directional communication between the location A and the location B.

first image inputting means provided at the location A for inputting a first image subject to pointing.

second image inputting means provided at the location B for inputting a second image serving as a pointer on the first image transmitted from the location A via said image transmitting means.

an image synthesizer provided at the location B for obtaining pixel data of an image by synthesis of the first image transmitted from the location A via said image transmitting means and the second image input through said second image inputting means.

first displaying means provided at the location B for displaying a pixel data output of said image synthesizer, and second displaying means provided at the location A for displaying a pixel data output of said image synthesizer transmitted via said image transmitting means.

said image synthesizer including:
- a converting circuit for outputting pixel data as a result of the conversion of pixel data of the first image fed in synchronization with a clock signal.
- condition detecting means for sending out a coincidence signal when a match is found between pixel data of the second image and a requirement defined by given condition data, said condition data defining the an allowable color range for each color of the pixel data of said second image, and
- a data selector for performing a selective outputting function of outputting pixel data output from said converting circuit when said condition detecting means sends out a coincidence signal, or of outputting otherwise pixel data of the first image.

9. An image pointing system wherein an image captured at a location A is added pointing information at a remote location B. thereafter being simultaneously displayed at each location, said image pointing system comprising:

image transmitting means for bi-directional communication between the location A and the location B.

first image inputting means provided at the location A for inputting a first image subject to pointing, second image inputting means provided at the location B for inputting a second image serving as a pointer on the first image transmitted from the location A via said image transmitting means, a first image synthesizer provided at the location B for obtaining pixel data of an image by synthesis of the first image transmitted from the location A via said image transmitting means the second image input from said second image inputting means, first displaying means provided at the location B for displaying a pixel data output of said first image synthesizer, a second image synthesizer provided at the location A for obtaining pixel data of an image by synthesis of the first image input through said first image inputting means the second image transmitted from the location B via said image transmitting means, and second displaying means provided at the location A for displaying pixel data of said second image synthesizer, said first and second image synthesizers each including:
a mixing circuit for assigning a weight to pixel data of the first image as well as to pixel data of the second image, each pixel data being fed in synchronization with a clock signal, multiplying each pixel data by its weight assigned, summing the results, and outputting resulting pixel data, said weight being greater than 0 and less than 1, condition detecting means for sending out a coincidence signal when a match is found between pixel data of the second image and a requirement defined by given condition data, said condition data definition an allowable color range for each color of the pixel data of said second image, and a data selector for performing a selective outputting function of outputting pixel data output from said mixing circuit when said condition detecting means sends out a coincidence signal, or of outputting otherwise pixel data of the first image.

10. An image pointing system wherein an image captured at a location A is added pointing information at a remote location B, thereafter being simultaneously displayed at each location, said image pointing system comprising:

image transmitting means for bi-directional communication between the location A and the location B, first image inputting means provided at the location A for inputting a first image subject to pointing, second image inputting means provided at the location B for inputting a second image serving as a pointer on the first image transmitted from the location A via said image transmitting means, a first image synthesizer provided at the location B for obtaining a pixel data of an image by synthesis of the first image transmitted from the location A via said image transmitting means and the second image input from said second image inputting means, first displaying means provided at the location B for displaying a pixel data output of said first image synthesizer, a second image synthesizer provided at the location A for obtaining pixel data of an image by synthesis of the first image input through said first image inputting means and the second image transmitted from the location B via said image transmitting means, and second displaying means provided at the location A for displaying pixel data of said second image synthesizer, said first and second image synthesizers each including:
a converting circuit for outputting pixel data as a result of the conversion of pixel data of the first image fed in synchronization with a clock signal, condition detecting means for sending out a coincidence signal when a match is found between pixel data of the second image and a requirement defined by given condition data, said condition defining an allowable color range for each color of the pixel data of said second image, and a data selector for performing a selective outputting function of outputting pixel data output from said converting circuit when said condition detecting means sends out a coincidence signal, or of outputting otherwise pixel data of the first image.

* * * * *